United States Patent
Wang et al.

(10) Patent No.: US 10,345,470 B2
(45) Date of Patent: Jul. 9, 2019

(54) DEVICE AND METHOD FOR DEGHOSTING SEISMIC DATA USING SPARSE TAU-P INVERSION

(71) Applicant: CGG SERVICES SA, Massy (FR)

(72) Inventors: Ping Wang, Sugar Land, TX (US); Suryadeep Ray, Houston, TX (US); Kawin Nimsaila, Houston, TX (US); Hongzheng Jin, Katy, TX (US); Can Peng, Fulshear, TX (US)

(73) Assignee: CGG SERVICES SAS, Massy (FR)

( * ) Notice: Subject to any disclaimer, the term of this patent is extended or adjusted under 35 U.S.C. 154(b) by 341 days.

(21) Appl. No.: 15/109,840

(22) PCT Filed: Jan. 8, 2015

(86) PCT No.: PCT/IB2015/000175
§ 371 (c)(1),
(2) Date: Jul. 6, 2016

(87) PCT Pub. No.: WO2015/104637
PCT Pub. Date: Jul. 16, 2015

(65) Prior Publication Data
US 2016/0327670 A1 Nov. 10, 2016

Related U.S. Application Data

(60) Provisional application No. 61/971,571, filed on Mar. 28, 2014, provisional application No. 61/926,697, filed on Jan. 13, 2014.

(51) Int. Cl.
*G01V 1/32* (2006.01)
*G01V 1/36* (2006.01)
*G01V 1/38* (2006.01)

(52) U.S. Cl.
CPC .............. *G01V 1/364* (2013.01); *G01V 1/325* (2013.01); *G01V 1/362* (2013.01); *G01V 1/3808* (2013.01);
(Continued)

(58) Field of Classification Search
None
See application file for complete search history.

(56) References Cited

U.S. PATENT DOCUMENTS

| 4,437,175 A | 3/1984 | Berni |
| 4,486,865 A | 12/1984 | Ruehle |

(Continued)

OTHER PUBLICATIONS

Tim T. Y. Lin and Felix J. Herrmann, Robust estimation of primaries by sparse inversion via one-norm minimization, Geophysics, vol. 78, No. 3 (May-Jun. 2013); p. RI33-RI50.*

(Continued)

*Primary Examiner* — Gregory J Toatley, Jr.
*Assistant Examiner* — Brandon J Becker
(74) *Attorney, Agent, or Firm* — Patent Portfolio Builders PLLC (57) ABSTRACT

Computing device, computer instructions and method for improving accuracy of an image of a surveyed subsurface. The method includes a step of receiving seismic data (D) recorded with seismic sensors; a step of deghosting the seismic data (D) using a sparse$_{T-P}$ inversion algorithm together with a low-rank optimization scheme and a high-cut filter to calculate ghost-free wave-fields ($U_0(t,x,y)$) in the time-space domain; and a step of processing the ghost-free wave-fields ($U_0(t,x,y)$) to generate the image of the surveyed subsurface.

20 Claims, 7 Drawing Sheets

(52) U.S. Cl.
CPC ...... *G01V 2210/47* (2013.01); *G01V 2210/56* (2013.01)

(56) References Cited

U.S. PATENT DOCUMENTS

| | | | |
|---|---|---|---|
| 4,992,992 | A | 2/1991 | Dragoset, Jr. |
| 6,219,621 | B1* | 4/2001 | Hornbostel .............. G01V 1/36 702/14 |
| 8,456,951 | B2 | 6/2013 | Soubaras |
| 8,593,904 | B2 | 11/2013 | Soubaras |
| 8,634,271 | B2* | 1/2014 | Sablon ..................... G01V 1/36 367/24 |
| 9,103,941 | B2 | 8/2015 | Poole |
| 2011/0002192 | A1* | 1/2011 | Ozbek .................... G01V 1/364 367/15 |
| 2011/0063946 | A1* | 3/2011 | Muyzert .............. G01V 1/3808 367/13 |
| 2011/0238390 | A1* | 9/2011 | Krebs .................... G01V 1/282 703/2 |
| 2011/0292762 | A1* | 12/2011 | Ozdemir .............. G01V 1/3808 367/24 |
| 2012/0253758 | A1* | 10/2012 | Lazaratos .............. G01V 1/282 703/2 |
| 2013/0121109 | A1* | 5/2013 | Baardman ................ G01V 1/36 367/24 |
| 2013/0242696 | A1* | 9/2013 | van Groenestijn .... G01V 1/364 367/24 |
| 2015/0236668 | A1* | 8/2015 | Poole ................. H03H 17/0248 703/2 |

OTHER PUBLICATIONS

Eiken, O., et al.; "A proven method for acquiring highly repeatable towed streamer seismic data"; Geophysics, vol. 68, No. 4; Jul. 31, 2003; pp. 1303-1309.

Martin, J., et al.; "Acquisition of marine point received seismic data with a towed streamer"; Seg, Technical Program Expanded Abstracts 2000; Dec. 31, 2000; pp. 37-40.

Moldoveanu, N., et al.; "Over/under towed-streamer acquisition: A method to extend seismic bandwidth to both ligher and lower frequencies"; The Leading Edge, vol. 26, No. 1; Jan. 31, 2007; pp. 41-58.

Written Opinion in Singapore Application No. 11201605709Q dated Jul. 20, 2018. (All references not cited herewith have been previously made of record.).

Written Opinion received in corresponding Singapore Application No. 11201605709Q, dated Jul. 18, 2017. All references cited therein have been previously made of record.

International Search Report in related International Application No. PCT/IB2015/000175, dated Aug. 17, 2015.

Written Opinion of the International Searching Authority in related International Application No. PCT/IB2015/000175, dated Aug. 17, 2015.

P. Herrmann et al., "De-aliased, High-resolution Radon Transforms", SEG Technical Program Expanded Abstract, 2000, pp. 1953-1956.

K. Hokstad et al., "3D Surface-related Multiple Elimination Using Parabolic Sparse Inversion", Geophysics, Nov.-Dec. 2006, vol. 71, No. 6, pp. V145-V152.

T.T.Y. Lin et al., "Robust Estimation of Primaries by Sparse Inversion Via One-norm Minimization", Geophysics, May 2013, vol. 78, No. 3, pp. R133-R150.

A.V. Özbek et al., Crossline Wavefield Reconstruction from Multi-Component Streamer Data, Part 2: Joint Interpolation and 3D Up/Down Separation by Generalized Matching Pursuit, Geophysics, Nov.-Dec. 2010, vol. 75, No. 6, pp. WB69-WB85.

Peng et al., "Cooperative Noise Attenuation in a Complex Wavelet Transform Domain", 76th EAGE Conference & Exhibition, Extended Abstracts, Jun. 16, 2014.

D. Trad et al., "Latest Views of the Sparse Radon Transform", Geophysics, Jan.-Feb. 2003, vol. 68, No. 1, pp. 386-399.

M. Vassallo et al., "Crossline Wavefiled Reconstruction from Multi-Component Streamer Data, Part 1: Multichannel Interpolation by Matching Pursuit (MIMAP) Using Pressure and Its Crossline Gradient", Geophysics, Nov.-Dec. 2010, vol. 75, No. 6, pp. WB53-WB67.

P. Wang et al., "Premigration Deghosting for Marine Streamer Data Using a Bootstrap Approach in Tau-P Domain Introduction", 75th EAGE Conference & Exhibition, Jun. 10, 2013, pp. 1-5.

\* cited by examiner

Figure 1
(Background)

DEVICE AND METHOD FOR DEGHOSTING SEISMIC DATA USING SPARSE TAU-P INVERSION

CROSS-REFERENCE TO RELATED APPLICATIONS

The present application is related to and claims the benefit of priority of U.S. Provisional Application 61/926,697 filed Jan. 13, 2014, titled, "3D Joint Deghost and Crossline Interpolation For Marine Single-component Streamer Data," authored by P. Wang, S. Ray and K. Nimsaila; and U.S. Provisional Application 61/971,571, filed Mar. 28, 2014, titled, "Multi-sensor deghosting using joint sparse Tau-P Inversion," authored by P. Wang, H. Jin and S. Ray, the entire contents of which are incorporated herein by reference.

BACKGROUND

Technical Field

Embodiments of the subject matter disclosed herein generally relate to methods and systems and, more particularly, to mechanisms and techniques for deghosting wave-fields collected with receivers located either on streamers or on or close to the ocean bottom.

Discussion of the Background

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

Figure 1:
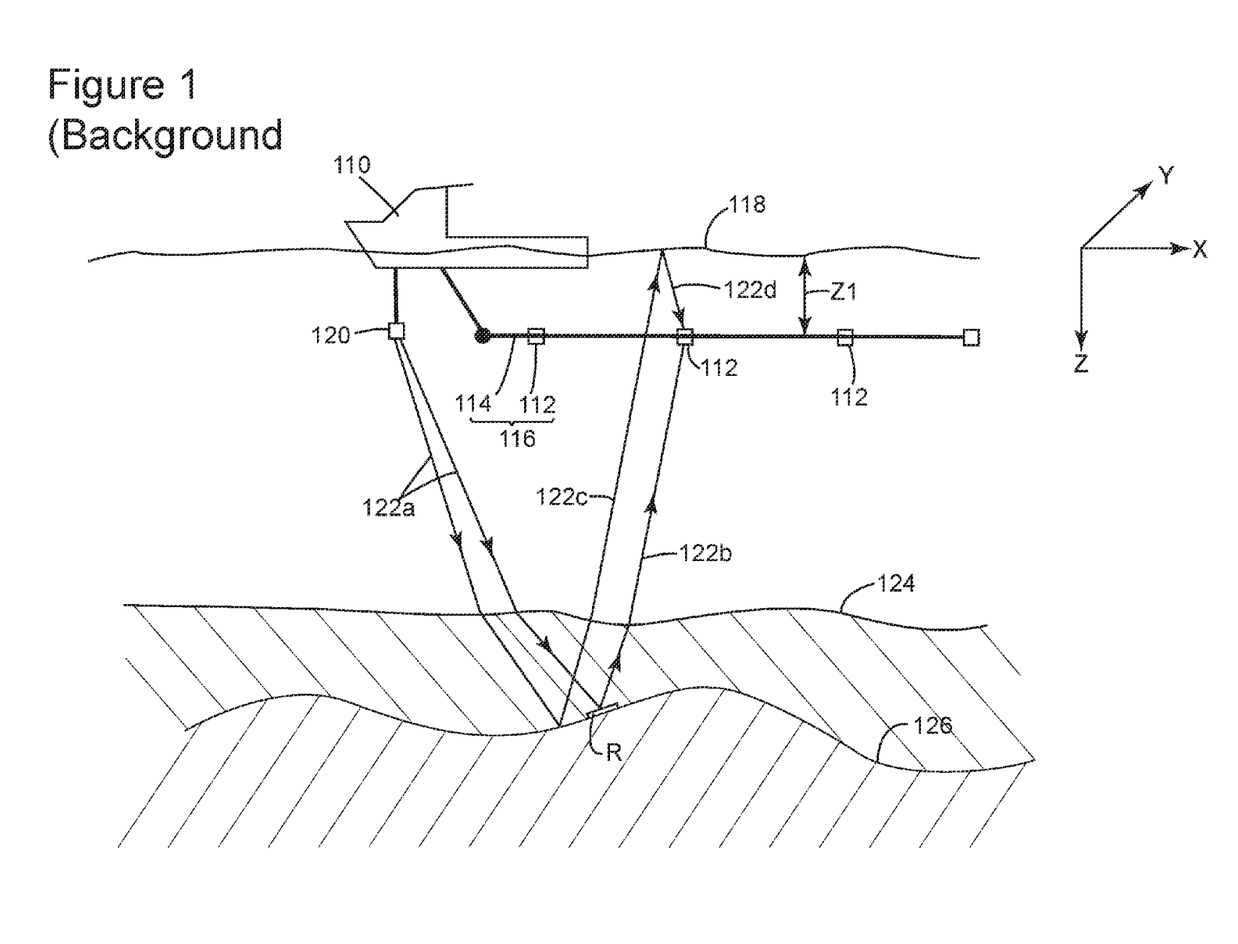
FIG. 1 is a schematic diagram of a conventional seismic data acquisition system having a horizontal streamer.

During a seismic gathering process, as shown in FIG. 1, a vessel 110 tows plural detectors 112, which are disposed along a cable 114. Cable 114 together with its corresponding detectors 112 are sometimes referred to, by those skilled in the art, as a streamer 116. Vessel 110 may tow plural streamers 116 at the same time. Streamers may be disposed horizontally, i.e., lie at a constant depth $z_1$ relative to the ocean surface 118. Also, plural streamers 116 may form a constant angle (i.e., the streamers may be slanted) with respect to the ocean surface as disclosed in U.S. Pat. No. 4,992,992, the entire content of which is incorporated herein by reference. In one embodiment, the streamers may have a curved profile as described, for example, in U.S. Pat. No. 8,593,904, the entire content of which is incorporated herein by reference.

Still with reference to FIG. 1, vessel 110 may also tow a seismic source 120 configured to generate an acoustic wave 122a. Acoustic wave 122a propagates downward and penetrates the seafloor 124, eventually being reflected by a reflecting structure 126 (reflector R). Reflected acoustic wave 122b propagates upward and is detected by detector 112. For simplicity, FIG. 1 shows only two paths 122a corresponding to the acoustic wave. Parts of reflected acoustic wave 122b (primary) are recorded by various detectors 112 (recorded signals are called traces) while parts of reflected wave 122c pass detectors 112 and arrive at the water surface 118. Since the interface between the water and air is well approximated as a quasi-perfect reflector (i.e., the water surface acts as a mirror for acoustic waves), reflected wave 122c is reflected back toward detector 112 as shown by wave 122d in FIG. 1. Wave 122d is normally referred to as a ghost wave because it is due to a spurious reflection.

Ghosts are also recorded by detector 112, but with a reverse polarity and a time lag relative to primary wave 122b if the detector is a hydrophone. The degenerative effect that ghost arrival has on seismic bandwidth and resolution is known. In essence, interference between primary and ghost arrivals causes notches, or gaps, in the frequency content recorded by detectors.

Recorded traces may be used to determine the subsurface (i.e., earth structure below surface 124) and to determine the position and presence of reflectors 126, which is associated with the detection of oil and/or gas reservoirs. However, ghosts disturb the accuracy of the final image of the subsurface and, for at least this reason, various methods exist for removing the ghosts, i.e., deghosting, from the acquired seismic data.

Research studies have been performed to use the pressure data (P) and the particle velocity ($V_z$) to remove the receiver ghost (e.g., U.S. Pat. Nos. 4,437,175, 4,486,865). Different from the pressure data recorded by hydrophones, particle velocity is measured by geophones or accelerometers that bear the vertical direction (up or down) of the wave propagation. The up-going wave-fields (the primary) detected by the geophone and hydrophone are in-phase, and the down-going wave-fields (the receiver ghost) are 180° out-of-phase. Therefore, these two components are complementary to each other in terms of receiver ghost attenuation.

For variable-depth streamers, a deghosting process has been disclosed, for example, in U.S. Pat. No. 8,456,951 (herein '951) authored by R Soubaras, the entire content of which is incorporated herein. According to the '951 patent, a method for deghosting uses joint deconvolution for migration and mirror migration images to generate a final image of a subsurface. Deghosting is performed at the end of processing (during an imaging phase) and not at the beginning, as with traditional methods. Further, the '951 patent discloses that no datuming step is performed on the data.

Another method that addresses variable-depth data is disclosed by U.S. patent application Ser. No. 13/334,776 (herein 776) authored by G. Poole. This method uses a surface datum τ-p model that represents input shot data. A transform from the τ-p model to a shot domain (offset-time) combines the operations of redatuming and reghosting. The use of variable-depth streamer data combined with reghosting ensures that a single point in the τ-p domain satisfies a range of different ghost lags, therefore, making use of variable-depth data notch diversity, which ensures effective receiver deghosting.

However, existing methods relate to pressure measurements made, for example, by hydrophones. Currently, the new streamer generation is capable of measuring not only pressure but also particle motion data, e.g., displacement, velocity, differential pressure, acceleration, etc. Thus, there is a need to process not only pressure measurements, but also particle motion data. Accordingly, it would be desirable to provide systems and methods with such capabilities.

SUMMARY

According to an embodiment, there is a method for improving accuracy of an image of a surveyed subsurface. The method includes receiving seismic data (D) recorded with seismic sensors; deghosting the seismic data (D) using a sparse τ-p inversion algorithm together with a low-rank optimization scheme and a high-cut filter to calculate ghost-free wave-fields ($U_0(t,x,y)$) in the time-space domain; and processing the ghost-free wave-fields ($U_0(t,x,y)$) to generate the image of the surveyed subsurface.

According to another embodiment, there is a computing device for improving accuracy of an image of a surveyed subsurface, the computing device including an interface configured to receive seismic data (D) recorded with seismic sensors; and a processor connected to the interface. The processor is configured to deghost the seismic data (D) using a sparse τ-p inversion algorithm together with a low-rank optimization scheme and a high-cut filter to calculate ghost-free wave-fields ($U_0(t,x,y)$) in the time-space domain; and process the ghost-free wave-fields ($U_0(t,x,y)$ to generate the image of the surveyed subsurface.

According to still another embodiment, there is a non-transitory computer readable medium including computer executable instructions, wherein the instructions, when executed by a processor, implement instructions for improving accuracy of an image of a surveyed subsurface, the instructions implementing the method discussed above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to pressure and particle acceleration measurements associated with seismic data. However, the embodiments to be discussed next are not limited to these measurements. Other measurements, e.g., particle displacement and/or particle velocity measurements, may be used instead of or in addition to particle acceleration measurements. A generic name to be used herein for velocity, displacement, pressure gradient, and acceleration measurements is particle motion data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method for improving accuracy of an image of a surveyed subsurface. The method includes a step of receiving seismic data (D) recorded with seismic sensors, deghosting the seismic data (D) using a sparse τ-p inversion algorithm together with a low-rank optimization scheme and a high-cut filter to calculate ghost-free wave-fields ($U_0(t,x,y)$) in the time-space domain, and a step of processing the ghost-free wave-fields ($U_0(t,x,y)$ to generate the improved image of the surveyed subsurface.

According to an embodiment, hydrophone and particle velocity data collected from receivers (located on streamers, ocean bottom cables, autonomous vehicles, etc.) are processed as now discussed. Note that in the field of oil and gas, there are existing processes for taking seismic raw data and applying various known processing steps, e.g., migration, denoising, deghosting, etc., for generating an image of the surveyed subsurface. Based on this image, which can be represented in print, on a screen, in a tabular way, etc., an oil and gas reservoir interpreter determines whether oil and/or gas is present in the surveyed subsurface and advises an oil and gas company where to drill a well. The embodiments discussed next improve this technological process of detecting oil and/or gas reservoirs by generating a more accurate ghost-free pressure wave-field, which results in reduced cost associated with the drilling process.

More specifically, removing the receiver ghost of marine data, for example, before migration provides better low- and high-frequency responses as well as a higher signal-to-noise ratio for preprocessing steps, such as multiple suppression and velocity analysis. The combination of pressure data recorded by hydrophones or other equivalent sensors and particle velocity data recorded by motion sensors has the potential of reliably deriving a broadband and ghost-free wave-field. In one embodiment, a progressive joint sparse τ-p inversion method is presented that performs 3D deghosting using pressure data (P), the acceleration z-component ($A_z$), and the acceleration y-component ($A_y$).

One or more of the embodiments discussed herein present a method that overcomes the Nyquist limitation imposed by the large cable spacing through sparse inversion, as well as extra constraints from up-going and down-going wave-fields in all the three components.

According to an embodiment, it is assumed that both pressure and particle velocity data is recorded with one or more streamers, and this data is available for processing. Consider that $\hat{U}_0(t; x_i, y_i)$ is a ghost-free, up-going pressure wave-field (the target of the algorithm) that is recorded on the surface ($z_i=0$). The ghost-free up-going pressure wave-field $\hat{U}_0(t; x_i, y_i)$ in the time-space domain can be transformed into the f-frequency-x-slowness-y-slowness domain f-$p_x$-$p_y$ as described by equation (1):

$$U_0(f; p_x^j, p_y^j) = \frac{1}{n}\sum_i e^{i2\pi f(x_i p_x^j + y_i p_y^j - z_i p_z^j)} \sum_t \hat{U}_0(t; x_i, y_i)e^{i2\pi ft}, \quad (1)$$

where i=1, 2 . . . , n, with n being the total number of receivers located at $(x_i, y_i, z_i)$, and j=1, 2 . . . , m, with m being the total number of slowness $(p_x^j, p_y^j, p_z^j)$. Note that the slowness represents the transformation of the position from the space domain into the τ-p domain. The term $z_i p_z^j$ in equation (1) is zero if the wave-field is recorded at the surface, i.e., $z_i = 0$. This zero term is maintained in equation (1) because it is easier to understand later how the derivative with respect to z is calculated. The slowness in each direction is bounded by water velocity v:

$$v^{-2} = (p_x^j)^2 + (p_y^j)^2 + (p_z^j)^2. \tag{2}$$

Up-going U and down-going D pressure data recorded by the receivers on the streamer can be written as:

$$\begin{cases} U(f; x_i, y_i) = \sum_j e^{-i\pi f T_i^j} L U_0 \\ D(f; x_i, y_i) = -\sum_j e^{i\pi f T_i^j} L U_0 \end{cases}, \tag{3}$$

where L is the reverse τ-p transform operator (i.e., the operator that transforms a τ-p element into a time-space element), and the transform operator L is given by:

$$L(f; x_i, y_i, p_x^j, p_y^j) = e^{-2\pi f (x_i p_x^j + y_i p_y^j)}, \tag{4}$$

and $T_i^j$ is the ghost-delay time determined by the known receiver depth $r_i$ and the slowness $(p_x^j, p_y^j)$, $$T_i^j = 2r_i \sqrt{v^{-2} - (p_x^j)^2 - (p_y^j)^2}. \tag{5}$$

The total pressure wave-field recorded by receivers on the cable, $P(f; x_i, y_i)$, is the summation of the up-going U and down-going D wave-fields as noted in equation (6):

$$P = U + D = \Sigma_j R_p L U_0, \tag{6}$$

with $R_p$ being the reghosting operator for pressure data P given by equation (7):

$$R_p(f; x_i, y_i; p_x^j, p_y^j) = e^{-i\pi f T_i^j} - e^{i\pi f T_i^j}. \tag{7}$$

Using the relationship between pressure P and particle acceleration A, $$\rho(A_x, A_y, A_z) = -(\partial P / \partial x, \partial P / \partial y, \partial P / \partial z), \tag{8}$$

it is possible to obtain the total acceleration z-component $A_z(f; x_i, y_i)$ as:

$$A_z = \frac{1}{\rho v} \sum_j i 2\pi f v p_z R_z L U_0, \tag{9}$$

with ρv being the water impedance, i2πf being the time-differentiation operator, $R_z$ being the reghosting operator for $A_z$, i.e., $$R_z(f; x_i, y_i; p_x^j, p_y^j) = e^{-i\pi f T_i^j} + e^{i\pi f T_i^j}, \tag{10}$$

and $vp_z$ being the reverse obliquity-correction operator for $A_z$, $$vp_z = \sqrt{1 - (vp_x)^2 - (vp_y)^2}. \tag{11}$$

Similarly, it is possible to obtain the total acceleration y-component, $A_y(f; x_i, y_i)$, $$A_y = -\frac{1}{\rho v} \sum_j i 2\pi f v p_y R_p L U_0, \tag{12}$$

with $vp_y$ being the reverse obliquity-correction operator for $A_y$. The sign difference between equations (7) and (10) is caused because the primary and ghost in P and $A_y$ have opposite polarities, while the ghost and primary in $A_z$ have the same polarities.

Using the operators defined above, a linear system is formulated as described in equation (13) to invert the $f$-$p_x$-$p_y$ domain ghost-free data with surface timing, $U_0(f; p_x^j, p_y^j)$ through a joint inversion using the three multi-components P, $A_z$, and $A_y$, $$\begin{pmatrix} P \\ \rho v F_z A_z \\ \rho v F_y A_y \end{pmatrix} = \begin{pmatrix} R_p L \\ i 2\pi f F_z \sqrt{1 - (vp_x)^2 - (vp_y)^2} \; R_z L \\ -i 2\pi f F_y v p_y R_p L \end{pmatrix} U_0, \tag{13}$$

with $F_z$ and $F_y$ being band-pass filters used to cope with the potential low signal-to-noise ratio (S/N) in certain frequency bands for $A_z$ and $A_y$. Both filters can be functions of $(f; p_x^j, p_y^j)$, depending on the signal-to-noise characteristics of these two components. In one application, both filters are the identity. In another application, only one of the two filters is the identity.

Figure 2:
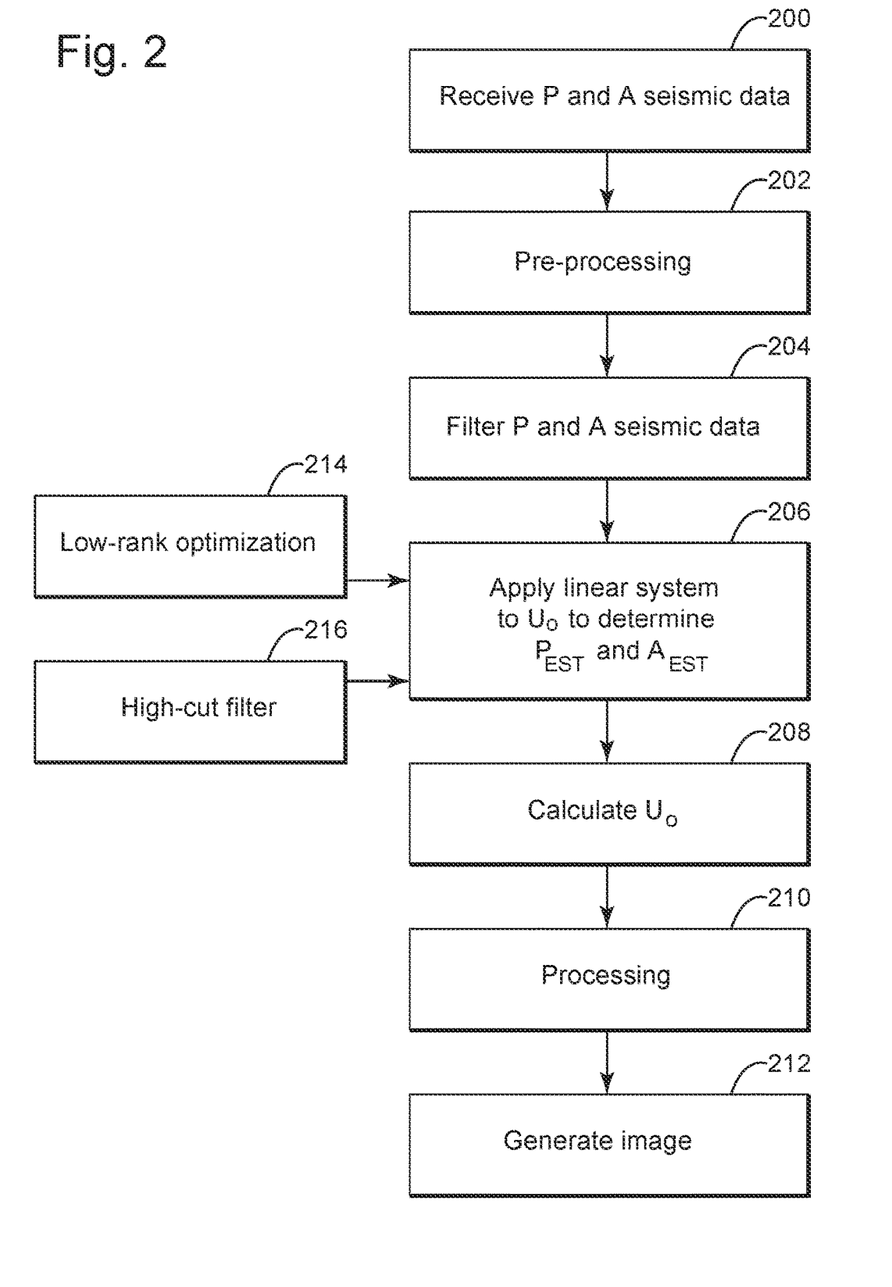
FIG. 2 is a flowchart of a deghosting method according to an embodiment.
Figure 3A:
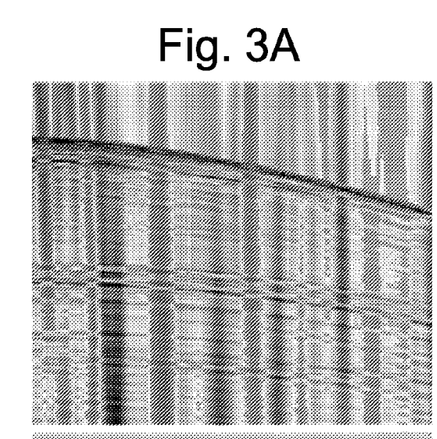
FIGS. 3A-C illustrate raw pressure and acceleration data.
Figure 3B:
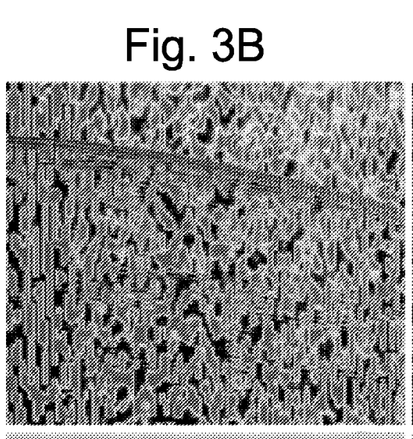
Figure 3C:
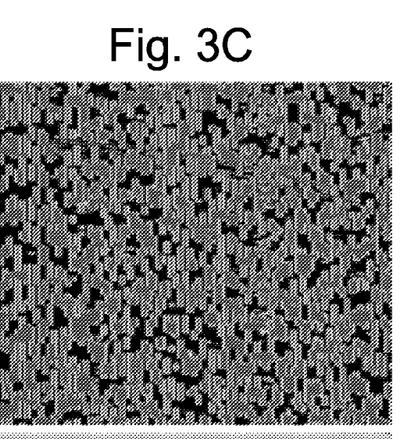
Figure 4A:
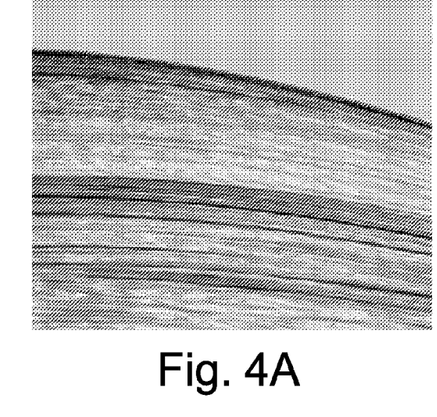
FIGS. 4A-C illustrate pressure and acceleration data after denoising.
Figure 4B:
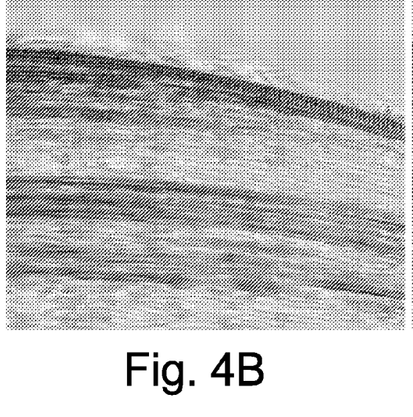
Figure 4C:
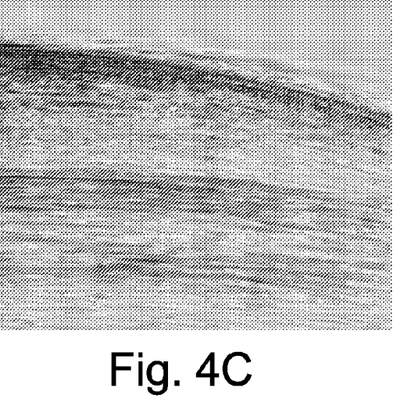

An iterative process may now be used to calculate the ghost-free, up-going pressure wave-field $U_0$ in the frequency-x-slowness-y-slowness domain as illustrated in FIG. 2. FIG. 2 is a flowchart that illustrates a possible implementation of the linear system (13) discussed above. More specifically, in step 200, seismic data recorded by the receivers on the streamers is received. As noted above, the seismic data may include pressure P and acceleration A information. In step 202, various pre-processing steps may be applied to condition the data, such as, for example, signature deconvolution, trace summing, motion correction, resampling, etc. In step 204, the acceleration A data may optionally be filtered with one or more filters F as discussed above with regard to equation (13). For example, a low-cut and f-k (frequency-wavenumber) dip-filtering to P and a cooperative denoise process (as described in Peng and Huang, 2014, "Cooperative noise attenuation in a complex wavelet transform domain," 76th Conference & Exhibition, EAGE, Extended Abstracts, the entire content of which is incorporated herein) to $A_z$ and $A_y$ may be applied. When this step has been applied to real data as illustrated in FIGS. 3A-C, where FIG. 3A illustrates the raw P data, FIG. 3B illustrates the raw $A_z$ data and FIG. 3C illustrates the raw $A_y$ data, most of the noise from the input data sets is attenuated as illustrated in FIGS. 4A-C, where FIG. 4A shows the P data after denoise, FIG. 4B shows the $A_z$ data after cooperative denoise, and FIG. 4C shows the $A_y$ data after cooperative denoise.

In step 206, the ghost-free, up-going pressure wave-field $U_0$ is calculated with an inversion algorithm. This means that an initial value for $U_0$ may be chosen arbitrarily or based on the expert's experience processing the data and a set of estimates for pressure $P_{est}$ and acceleration $A_{est}$ that are calculated based on equation (13) and the selected ghost-free, up-going pressure wave-field $U_0$. Then, a comparison is made between the estimates $P_{est}$ and $A_{est}$ and corresponding measures P and A, and if the pressure difference and the acceleration difference is larger than a given threshold, the value of $U_0$ is modified. These steps are repeated until the differences between $P_{est}$ and $A_{est}$ and corresponding P and A fall below the given threshold.

Note that the sparse τ-p inversion used in this step may be summarized as follows. Considering the input data to be described by matrix D (e.g., common shot), and the τ-p model of the ghost-free data being M, equation (13) can be rewritten as $$D(f,x,y)=T(f,x,y,p_x,p_y)M(f,p_x,p_y), \quad (14)$$

where T(f, x, y,$p_x$,$p_y$) is the matrix that includes the reghost and τ-p transformation. Note that while the recorded data D(t,x,y) is expressed in the time-space domain, this data is transformed to the frequency domain prior to being used in equation (14) as indicated by the frequency term "f."

Input seismic data D may include only pressure measurements, or only particle motion measurements, or both pressure and particle motion measurements. The domain in which equations (13) and (14) are solved may be one of a Radon domain (hyperbolic, parabolic, etc.), frequency-wavenumber domain, τ-p domain, rank reduction, singular value decomposition (SVD), and curvelet domain. In one application, an amount of noise is reduced by controlling sparseness weights W when the model domain is derived. The sparseness weights may also be derived to mitigate aliasing, which may be especially useful if only hydrophone or only particle velocity data is input. Processing in the model domain may also include muting, scaling, resampling, removing cross-talk or interference noise, re-datuming and vector rotation.

The sparse τ-p inversion algorithm may be expressed, for each iteration, as:

$$\min_{\tilde{M}_i} \|D - AW_i\tilde{M}_i\|^2, \quad (15)$$

with $W_i$ being the sparseness weight at iteration $i^{th}$. Applying the conjugate gradient least square method, equation (15) can be rewritten as:

$$(AW_i)^TD=(AW_i)^T(AW_i)\tilde{M}_i, \quad (16)$$

which has the following solution for model M:

$$M_i=W_i\tilde{M}_i. \quad (17)$$

The sparseness weights may be updated at each iteration based on equation (18):

$$W_{i+1}(j,j)=\|\tilde{M}_i(j)\|^p, \quad (18)$$

where p is the power of the norm $\| \ \|$.

Once the correct ghost-free, up-going pressure wave-field $U_0$ has been calculated in step 208, using the sparse τ-p inversion, traditional processing is applied in step 210 to the receiver ghost-free data, e.g., migration, and an image of the surveyed subsurface is generated in step 212. This image will be later used by other experts to predict whether oil and/or gas is present. After $U_0(f;p_x^j,p_y^j)$ has been found, an inverse τ-p transform and an inverse Fourier transform may be applied to obtain the receiver ghost-free data $\hat{U}_0(t;x_i, y_i)$ in the time-space domain, either on the original grid or a predefined regular/denser grid.

However, during step 206, one challenge for the inversion proposed in equation (13) is that the τ-p transform's basis is not orthogonal. As a result, it requires a large p-range and small p-increment (i.e., the model space is large, especially for high dimensions) to represent the input data accurately. On the other hand, the input data is often sparse (the reason that interpolation needs to be applied).

Thus, there is a need for many slowness pairs for the desired resolution. The requirement for a large number of slowness pairs not only makes the inversion prohibitively expensive, but also unstable/non-unique because the model space is much larger than the data space (see, for example, Trad et al., 2002, "Latest views of the sparse Radon transform," Geophysics, 68, 386-399). Therefore, it is possible to apply a low-rank optimization step 214 to reduce the model space before the full inversion is performed. In one application, it is possible to do first a full-rank inversion over high-cut filtered data using all p, and then the most dominant p are used for a low-rank, full-bandwidth inversion. By performing step 214, the algorithm not only becomes stable, but the cost is also significantly reduced.

Another challenge for the 3D inversion scheme illustrated by equation (13) is that, in marine towed streamer acquisitions, cross-line sampling is often irregular and very coarse, which makes the data in the cross-line direction highly spatially aliased for the high-frequency content of interest. To overcome this sampling issue, along with the low-rank optimization of step 214 to reduce the model parameters, the inversion scheme discussed with regard to FIG. 2 may use high-cut filtered data (e.g., 10 Hz) to get an initial result.

For example, the sparseness weights discussed above with regard to equation (18) may be derived initially at low frequencies (e.g., at values less than 10 Hz) and used to constrain the model at high frequencies. The sparseness weights may be updated during several iterations, e.g., a 0-10 Hz model is used to constrain a 0-20 Hz model, which is used to constrain a 0-40 Hz model, etc. In one application, the sparseness weights may be derived from the envelope of the τ-p model at each iteration.

Subsequently, it is possible to use this result to guide the inversion for data with higher frequency as explained, for example, in Herrmann et al., 2000, "De-aliased, high-resolution Radon transforms," 70th Annual International Meeting, SEG, Expanded Abstracts, pages 1953-1956, the entire content of which is incorporated herein by reference. This process can be repeated progressively until reaching the desired frequency.

In one embodiment, it is possible to use only the pressure data P in equation (13) to derive the receiver-ghost-free data $U_0$ and then reverse back the receiver ghost-free data using matrix T in equation (14) for calculating acceleration operators $A_z$ and/or $A_y$. Thus, according to this embodiment, it is possible to generate the equivalent acceleration data $A_z$ or $A_y$ from pressure data P, which can be used to attenuate the noise in $A_z$ or $A_y$ through a cooperative denoise process as discussed above.

The method illustrated in FIG. 2 has been tested on a seismic data set acquired by multi-sensor, variable-depth streamers that included hydrophones (for measuring pressure dataP) and accelerometers for z and y directions (for measuring particle velocity data $A_z$, $A_y$).

Figure 5A:
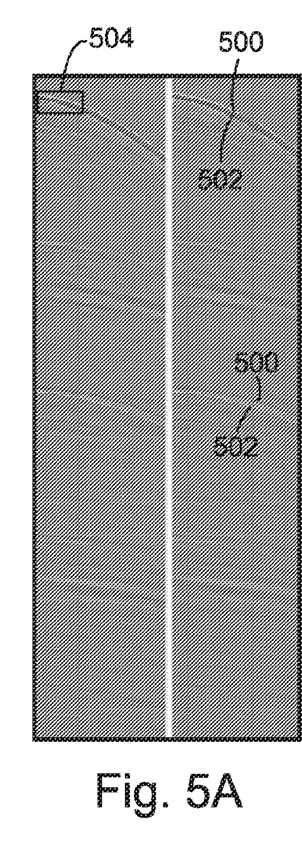
FIG. 5A illustrates seismic data before deghosting.
Figure 5B:
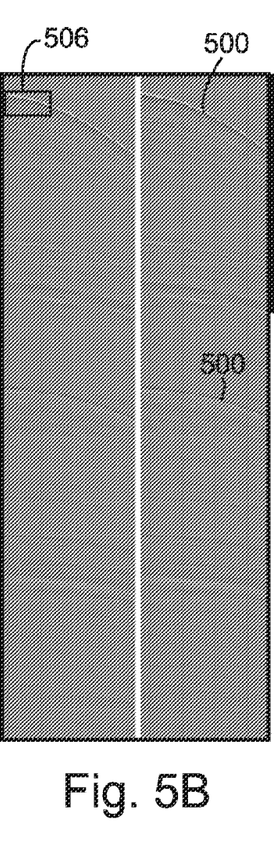
FIG. 5B illustrates the seismic data after deghosting.
Figure 5C:
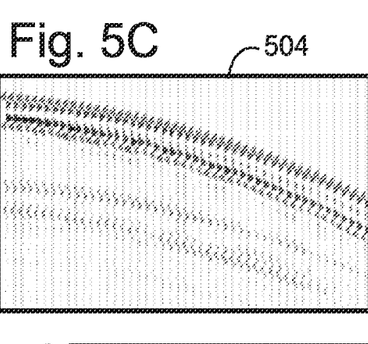
FIG. 5C shows an enlarged region from FIG. 5A.
Figure 5D:
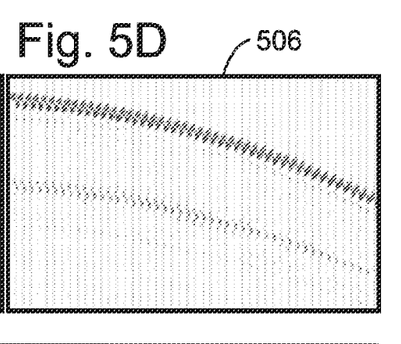
FIG. 5D shows an enlarged region from FIG. 5B.
Figure 5E:
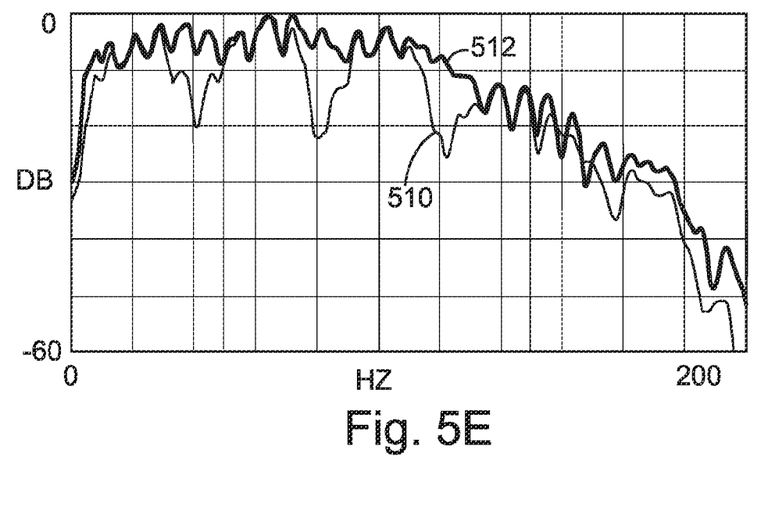
FIG. 5E shows amplitude spectra before and after deghosting.

FIG. 5a shows a couple of shot gathers for pressure data before receiver deghosting. The primary events 500 are followed by ghost events 502 with opposite polarities, which are effectively attenuated by the multi-sensor joint inversion algorithm as illustrated in FIG. 5b. The wavelet changes before applying the receiver deghosting method are illustrated in FIG. 5c, and after are illustrated in FIG. 5d, and they correspond to boxes 504 and 506 in FIGS. 5a and 5b, respectively. FIG. 5e shows the amplitude spectrum comparison before (line 510) and after (line 512) receiver deghosting. Those skilled in the art would note that the receiver ghost notches up to the fourth-order are effectively in-filled.

One or more of the above embodiments discloses a progressive joint sparse τ-p inversion method to perform 3D deghosting using multi-sensor marine towed streamer data. The resulting deghosted images have higher resolution and better defined geo-bodies for seismic interpretation and reservoir characterization. The deghosting algorithm overcomes the Nyquist limitation of large cable spacing because of the progressive sparse inversion and extra constraints from six consistent wave-fields (up-going and down-going wave-fields from three components).

Removing any one or two rows from equation (13) is equivalent to applying the deghosting inversion for one- or two-component data. For example, an embodiment that applies the above discussed deghosting inversion to only the pressure data P is now discussed.

According to this embodiment, a 3D joint deghost and cross-line interpolation is applied for single-component seismic data. For simplicity, marine seismic data is used in the following. However, the algorithm applies to land data or other types of data. In marine towed streamer acquisition, the cross-line sampling is often irregular and coarse. For these reasons, 3D deghosting and cross-line interpolation are considered to be extremely difficult using only single-component pressure data. In recent years, Vassallo et al. (Vassallo, M., Özbek, A., Özdemir, K., and Eggenberger, K. [2010], "Crossline wavefield reconstruction from multicomponent streamer data, Part 1: Interpolation by matching pursuit using pressure and its crossline gradient," Geophysics, 75, NO. 6) and Özbek et al. (Özbek, A., Vassallo, M., Özdemir, K., van Manen, D.-J., and Eggenberger, K. [2010] "Crossline wavefield reconstruction from multi-component streamer data, Part 2: Joint interpolation and 3D up/down separation by generalized matching pursuit," Geophysics, 75, NO. 6) proposed a Generalized Matching Pursuit (GMP) method for 3D joint deghost/interpolation using multicomponent data as input, which contains pressure data P and acceleration data $A_z$ and $A_y$. However, this method requires the acquisition of three times more data, and the acceleration components $A_z$ and $A_y$ often have much lower signal-to-noise ratios (SNR) compared to pressure data P. Thus, the following embodiment proposes a progressive sparse τ-p inversion method for 3D joint deghost/interpolation using only pressure data P.

Utilizing the ghost-delay time provided by equation (5) and the forward/reverse shifting time given by equation (19):

$$\tau_j^i = p_x^j x_i + p_y^j y_i, \quad (19)$$

it is possible to formulate a linear system to invert the f-$p_x$-$p_y$ domain ghost-free data with surface datuming $p(f,p_x^j,p_y^j)$, which, when reghosted and inverse τ-p transformed, equals the input data D as follows:

$$\begin{pmatrix} D(f, x_1, y_1) \\ D(f, x_2, y_2) \\ \vdots \\ D(f, x_n, y_n) \end{pmatrix} = \quad (20)$$

$$\begin{pmatrix} (e^{-i\pi\pi f_1^1} - e^{i\pi\pi f_1^1}) & (e^{-i\pi\pi f_1^2} - e^{i\pi\pi f_1^2}) & \cdots & (e^{-i\pi\pi f_1^m} - e^{i\pi\pi f_1^m})e^{-i2\pi f \tau_m^1} \\ e^{-i2\pi f \tau_1^1} & e^{-i2\pi f \tau_2^1} & & \\ (e^{-i\pi\pi f_2^1} - e^{i\pi\pi f_2^1}) & (e^{-i\pi\pi f_2^2} - e^{i\pi\pi f_2^2}) & \cdots & (e^{-i\pi\pi f_2^m} - e^{i\pi\pi f_2^m})e^{-i2\pi f \tau_m^2} \\ e^{-i2\pi f \tau_1^2} & e^{-i2\pi f \tau_2^2} & & \\ \cdots & \cdots & \cdots & \\ (e^{-i\pi\pi f_n^1} - e^{i\pi\pi f_n^1}) & (e^{-i\pi\pi f_n^2} - e^{i\pi\pi f_n^2}) & \cdots & (e^{-i\pi\pi f_n^m} - e^{i\pi\pi f_n^m})e^{-i2\pi f \tau_m^n} \\ e^{-i2\pi f \tau_1^n} & e^{-i2\pi f \tau_2^n} & & \end{pmatrix}$$

$$\begin{pmatrix} P(f, p_x^1, p_y^1) \\ P(f, p_x^2, p_y^2) \\ \vdots \\ P(f, p_x^m, p_y^m) \end{pmatrix},$$

with $e^{-i\pi\pi f^j} - e^{i\pi\pi f^{ij}}$ being the reghosting operator and $e^{-i2\pi f \tau_j^i}$ being the inverse f-$p_x$-$p_y$ transform operator for the $i^{th}$ channel and the $j^{th}$ slowness pair. The first term in the reghosting operator redatums the ghost-free data on the surface to obtain the primary on the cable, and the second term generates the ghost on the mirror cable and flips the polarity. Those skilled in the art would note that equation (20) is equation (13) rewritten with no acceleration data.

Similar to the challenges posed by equation (13) and discussed above, equation (20) requires a large number of slowness pairs because the input data P is sparse. Thus, the large number of pairs not only makes the inversion prohibitively expensive, but also unstable/non-unique because the model space is much larger than data space. Therefore, a low-rank optimization step may be applied as for equation (13) to reduce the model space before the full inversion is performed. If the low-rank optimization step is applied, not only is the computational cost lowered, but the inversion is more stable.

Another challenge for the 3D inversion scheme associated with equation (20) is that, in marine towed streamer acquisitions, cross-line sampling is often irregular and very coarse, which makes the data in the cross-line direction highly spatially aliased for the high-frequency content of interest. To overcome this sampling issue, as for equation (13), along with the low-rank optimization to reduce the model parameters, a high-cut filtered data (e.g., 10 Hz) is applied to get an initial result. Subsequently, this result is used to guide the inversion for data with higher frequency. This process can be repeated progressively until reaching the desired frequency.

After $P(f,p_x^j,p_y^j)$ has been found, an inverse f-$p_x$-$p_y$ transform is applied to obtain the primary $P(f,x_i,y_i)$ on either the original grid or a new predefined regular/denser grid. Thus, this algorithm generates data after both deghost and interpolation.

Figure 6A:
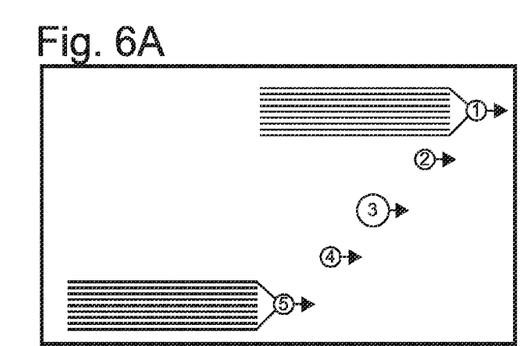
FIG. 6A illustrates an acquisition geometry of staggered streamers.
Figure 6B:
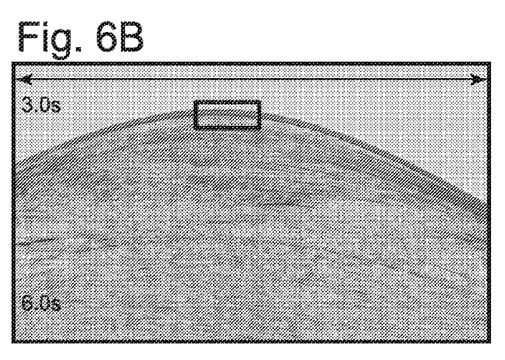
FIG. 6B illustrates a shot gather for one source.
Figure 6C:
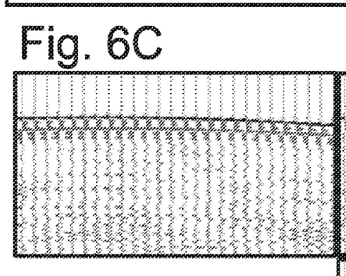
FIG. 6C illustrates the recorded seismic data.
Figure 6D:
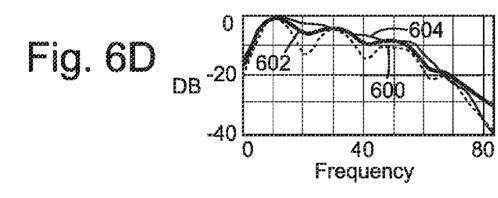
FIG. 6D illustrates a spectral comparison of the original data, the data deghosted with a traditional method as illustrated in FIGS. 6E and 6F and the data deghosted according to an embodiment as illustrated in FIGS. 6G and 6H.
Figure 6E:
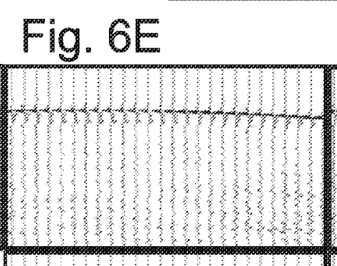
Figure 6F:
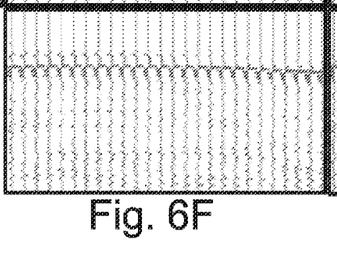
Figure 6G:
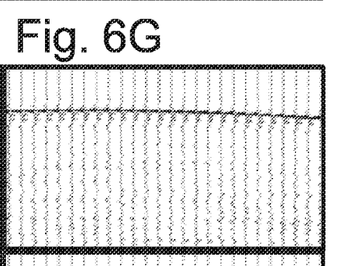
Figure 6H:
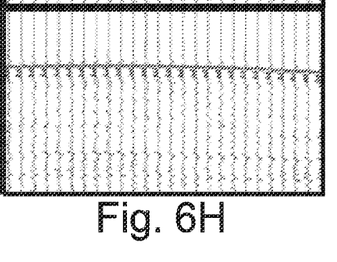

The algorithm was tested on full-azimuth (FAZ) towed streamer data acquired using multiple vessels and configurations designed to maximize azimuth variation while maintaining good offset distribution, as illustrated in FIG. 6A. FIG. 6a shows five vessels each towing a corresponding source and the two outside vessels also towing a corresponding streamer spread. This arrangement poses a challenge for deghosting the side-gun data illustrated in FIG. 6B, where the wave-field is strongly 3D. After applying the progressive sparse τ-p inversion method for 3D joint deghost/interpolation to the recorded (input) data represented in FIG. 6C, primary and ghost wavelets are obtained as illustrated in FIGS. 6G and 6H, respectively. The primary and ghost wavelets used with this method are more accurate than the wavelets obtained by applying the traditional pseudo-3D bootstrap method, which are illustrated in FIGS. 6E and 6F. FIG. 6B shows that the new 3D method better fills in the receiver ghost notches as illustrated by the spectral comparison of the (i) input data in FIG. 6C, which is represented by line 600, (ii) pseudo-3D primary in FIG. 6E, which is represented by line 602, and (iii) the primary 3D in FIG. 6G, which is represented by line 604.

Thus, these examples show that the method discussed above can achieve 3D deghosting and interpolation in one step using only single-component pressure data. This algorithm reduces the model parameters with low-rank optimization, applies a progressive sparse τ-p inversion starting from low-frequency data toward high-frequency data, and uses extra constraints provided by the ghost wave-field.

Although only towed streamer data has been discussed in this embodiment, the method can also be applied to remove the source ghost and regularize shot points for ocean bottom node (OBN) data using recorded node gathers as input. Furthermore, direction-dependent source designature for OBN data can also be managed with a similar scheme.

Figure 7:
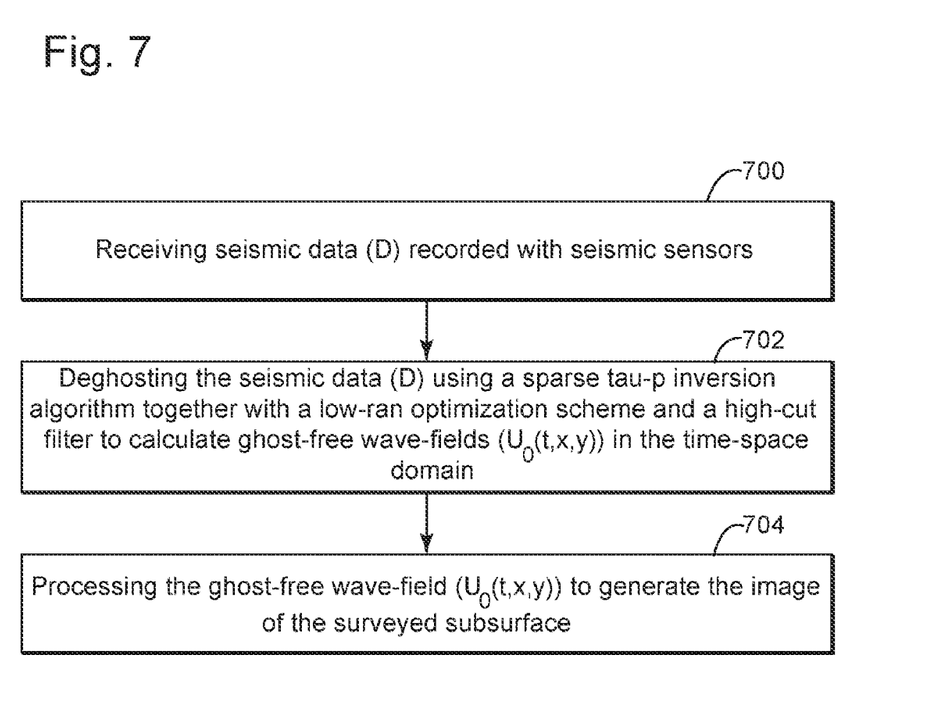
FIG. 7 is a flowchart of a method of deghosting data according to an embodiment.

A method for improving accuracy of an image of a surveyed subsurface is now discussed with regard to FIG. 7. The method includes a step 700 of receiving seismic data (D) recorded with seismic sensors, a step 702 of deghosting the seismic data (D) using a sparse τ-p inversion algorithm together with a low-rank optimization scheme and a high-cut filter to calculate ghost-free wave-fields ($U_0(t,x,y)$) in the time-space domain, and a step 704 of processing the ghost-free wave-fields ($U_0(t,x,y)$) to generate the image of the surveyed subsurface. The method may be modified or altered based on the previously discussed embodiments.

Input data for any of the above methods may be in any pre-stack domain, for example shot, receiver, midpoint, conversion point or cross-spread. The intention is that any of the above implementations would be made on a computer. While many of the previous embodiments discussed use multi-component measurements, it should be noted that where signal-to-noise ratio and sampling allows, the scheme(s) may be used with less data, e.g., hydrophone data only or particle motion data only. In particular, this may require more demands on sparseness constraints, e.g., beginning by solving the equations for a low-frequency bandwidth which is not aliased, and using the model to derive sparseness weights for the higher frequency model solution. Also, it may be possible to use as input pressure and particle motion data and to generate output that includes only pressure wave-fields or only particle motion wave-fields, as now discussed.

One embodiment may include using hydrophone-only data to construct an estimate of particle motion data. The estimate of particle motion data may or may not be corrected for obliquity. The estimate of particle motion data may or may not include wave-field separation. The estimate of particle motion data may be subtracted from recorded particle motion data to leave a residual. This residual particle motion data may then be denoised, following which the estimated particle motion data is added to the resulting denoised data.

Particle velocity data may be obtained from individual sensors, or summed (average or weighed sum) to form a receiver group. Particle velocity data may have been acquired directly or may be computed from accelerometer sensors (for example, by integration). Other types of particle motion sensor may be available. While the above embodiments relate to modeling of particle velocity data, a differentiation step may be included in the matrix formulations to work directly with accelerometer data. The differentiation could be applied in the time or the frequency domain. Receivers generate a marine streamer dataset that is achieved in a narrow, wide or multi-azimuth, coil shooting or any configuration towed with constant or variable depth (e.g., slant streamer, BroadSeis profile, over-under streamers), and the seismic data is generated with an air gun, marine vibrator, or other source element. Source elements may be fired according to any known scheme, e.g., continuously, simultaneously, flip-flop, etc. Receivers may also be used in ocean bottom survey (nodes, cables, or other with air gun, marine vibrator or other source), land dataset (dynamite, vibrator or other source), or a combination of two or more dataset types. The data may have been calibrated before applying the processes discussed herein, or calibration scalars may be included in the matrix formulations noted in the embodiments. Water velocity terms may be constant or allowed to vary with depth. Variation with depth can be of use for OBS datasets where there is a water velocity gradient. The methods may be used for one-sided or split-spread acquisition.

Equations described herein may be solved in the time domain or a spectral domain (e.g., frequency, Laplace, z-transform, etc.), wavelet domain (e.g., curvelet or other). Model M may be found through any inversion method, e.g., conjugate gradients, LU decomposition, Cholesky factorization, etc. Model M may be derived to represent all traces in the input shot, or may work on a subset of data from the input shot, for example, spatial windows of a given number of channels. Sparseness weights may be used in the inversion to improve results, for example, where there is poor signal-to-noise ratio or to overcome aliasing; e.g., iteratively reweighted least squares beginning with low frequencies and working up to higher frequencies. Other model domains may be used, for example, frequency-wavenumber (FK), parabolic Radon, hyperbolic Radon, etc. In fact, any fixed datum model domain may be defined as long as it can be reverse transformed, redatumed and reghosted for both hydrophone and particle velocity sensor data. Alternatively, an iterative approach similar to the anti-leakage τ-p transform can be used which also exhibits sparseness properties. No matter how the model is formed, it needs to simultaneously reproduce the hydrophone and particle velocity measurements through application of an operator, e.g., L.

Due to differing signal-to-noise ratios of hydrophone and particle velocity data, it may be necessary to define the inversion so as to satisfy the hydrophone data for a broader bandwidth than the particle velocity data. This may be implemented by including a frequency-dependent scaling term into the matrix or bandpass filtering the model and data for different conjugate gradient passes either by multiplication in the frequency domain or convolution by a bandpass filter in the time domain. For example, application of L may include a bandpass filter so that when applied, the bandwidth of particle velocity components is 25 Hz to 250 Hz, whereas the bandpass filter for hydrophone data is 2 Hz to 250 Hz.

It can also be possible to process hydrophone and particle motion data independently. The separate results may be combined afterwards, for example, by selecting different temporal frequency ranges based on signal-to-noise ratio data. At low frequencies, particle velocity data may be too noisy to be of value. Therefore, it may be necessary to use a pressure-only solution for low frequencies, and make use of a combined hydrophone-particle velocity solution for higher frequencies.

A generalized weighting scheme can be implemented to vary weighting between any component (hydrophone or particle motion) depending on the receiver, time and frequency, and/or wavenumber. This weighting refers to how well the model represents the data. Typically, accelerometer data is integrated to calculate particle velocity measurements. Instead of integrating accelerometer data before wave-field separation, it is also possible to build a differentiation operator into the inversion scheme. In the time domain, the application of operator L would then include redatum, reghost and differentiation. As an alternative to the described modeling approach, other forms of wave-field extrapolation may be used, which may include Kirchhoff, beam, wave-equation (one-way or two-way, RTM, etc.).

Figure 8:
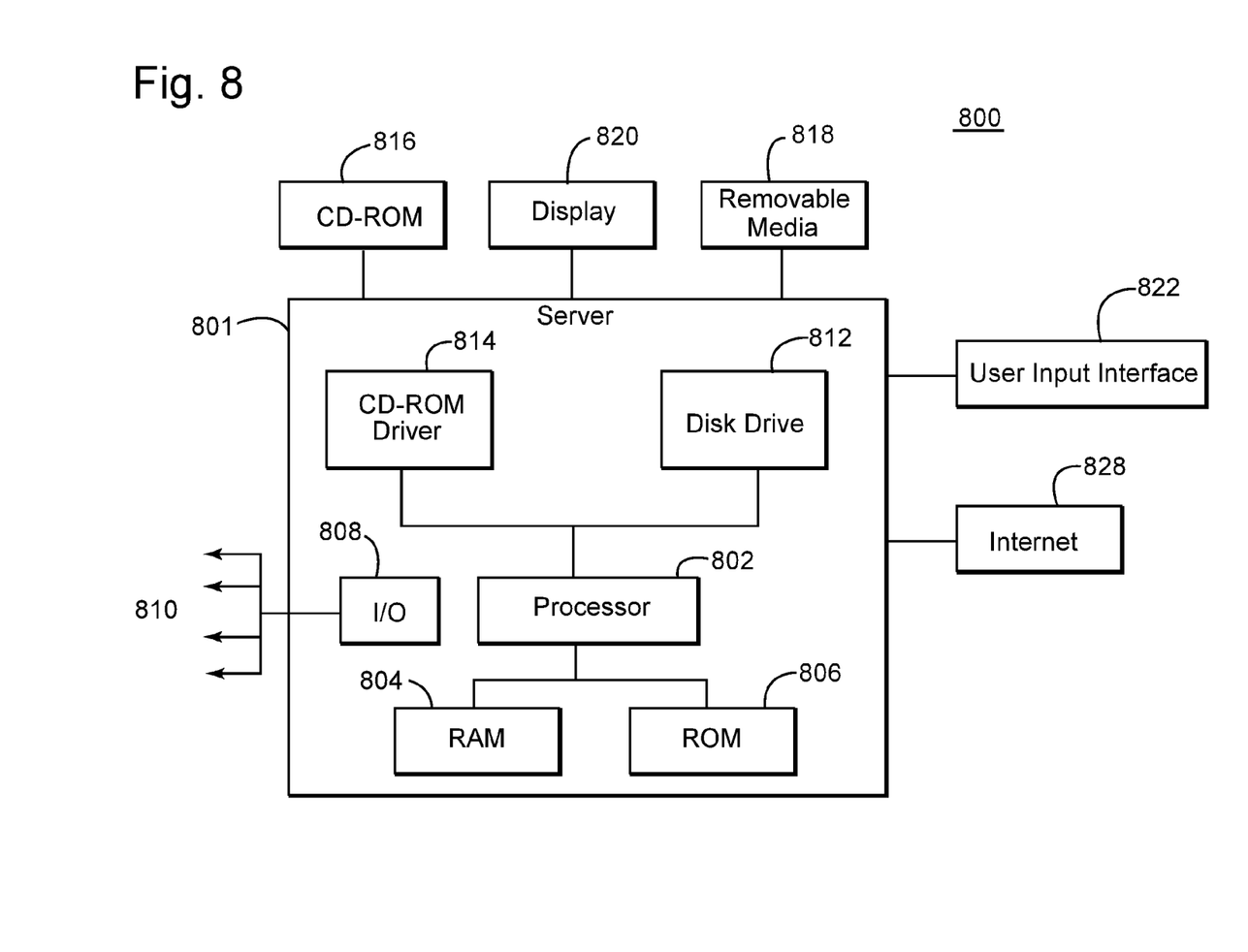
FIG. 8 is a schematic diagram of a computing device that can implement any of the methods discussed herein.

The above-discussed procedures and methods may be implemented in a computing device as illustrated in FIG. 8. Hardware, firmware, software or a combination thereof may be used to perform the various steps and operations described herein. Computing device 800 of FIG. 8 is an exemplary computing structure that may be used in connection with such a system.

Exemplary computing device 800 suitable for performing the activities described in the exemplary embodiments may include a server 801. Such a server 801 may include a central processor (CPU) 802 coupled to a random access memory (RAM) 804 and to a read-only memory (ROM) 806. ROM 806 may also be other types of storage media to store programs, such as programmable ROM (PROM), erasable PROM (EPROM), etc. Processor 802 may communicate with other internal and external components through input/output (I/O) circuitry 808 and bussing 810 to provide control signals and the like. Processor 802 carries out a variety of functions as are known in the art, as dictated by software and/or firmware instructions.

Server 801 may also include one or more data storage devices, including hard drives 812, CD-ROM drives 814 and other hardware capable of reading and/or storing information, such as DVD, etc. In one embodiment, software for carrying out the above-discussed steps may be stored and distributed on a CD-ROM or DVD 816, a USB storage device 818 or other form of media capable of portably storing information. These storage media may be inserted into, and read by, devices such as CD-ROM drive 814, disk drive 812, etc. Server 801 may be coupled to a display 820, which may be any type of known display or presentation screen, such as LCD, plasma display, cathode ray tube (CRT), etc. A user input interface 822 is provided, including one or more user interface mechanisms such as a mouse, keyboard, microphone, touchpad, touch screen, voice-recognition system, etc.

Server 801 may be coupled to other devices, such as sources, detectors, etc. The server may be part of a larger network configuration as in a global area network (GAN) such as the Internet 828, which allows ultimate connection to various landline and/or mobile computing devices.

The disclosed exemplary embodiments provide a computing device, software instructions and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for improving accuracy of an image of a surveyed subsurface, the method comprising:
receiving seismic data (D) recorded with seismic sensors;
deghosting the seismic data (D) using a sparse $\tau$-p inversion algorithm together with a low-rank optimization scheme to obtain a ghost-free up-going wavefield (U(f, px,py)) in $\tau$-p domain;
converting the ghost-free up-going wavefield in $\tau$-p domain into a ghost-free wave-fields ($U_0$(t,x,y)) in the time-space domain; and
processing the ghost-free wave-fields ($U_0$(t,x,y) to generate the image of the surveyed subsurface,
wherein a high-cut filter is used initially in the sparse $\tau$-p inversion algorithm to obtain an initial result for the ghost-free up-going wavefield in $\tau$-p domain, p is slowness, $\tau$ is arrival time, t is time, x and y are horizontal plane coordinates, and f is frequency.

2. The method of claim 1, wherein the seismic data includes only pressure data (P).

3. The method of claim 1, wherein the seismic data includes pressure data (P) recorded with hydrophones and particle motion data (A) recorded with particle motion sensors.

4. The method of claim 1, wherein the step of deghosting comprises:
applying band-pass filters (F) to particle motion data of the seismic data.

5. The method of claim 1, wherein the step of deghosting comprises:
constructing an operator T in a $\tau$-p domain, that when applied to ghost-free wave-fields (U(f,px,py)) in the $\tau$-p domain, produces estimates ($D_{est}$) of the seismic data; and
applying the low-rank optimization scheme to the operator T to reduce the dimension of the ghost-free wave-fields (U(f,px,py)) in the $\tau$-p domain.

6. The method of claim 5, further comprising:
using the initial result of the ghost-free wave-fields (U(f, px,py)) in the $\tau$-p domain to calculate a next ghost-free wave-field (U(f,px,py)) with a higher frequency; and
repeating the sparse $\tau$-p inversion algorithm to calculate the ghost-free wave-fields (U(f,px,py)) in the $\tau$-p domain.

7. The method of claim 6, further comprising:
applying a reverse $\tau$-p transform and an inverse Fourier transform to the ghost-free wave-fields (U(f,px,py)) in the $\tau$-p domain to obtain the ghost-free wave-fields ($U_0$(t,x,y)) in the time space-domain.

8. The method of claim 1, further comprising:
using only pressure data (P) to derive particle motion data (A).

9. The method of claim 1, wherein the seismic data is acquired with a variable-depth streamer.

10. A computing device for improving accuracy of an image of a surveyed subsurface, the computing device comprising:
an interface configured to receive seismic data (D) recorded with seismic sensors; and a processor connected to the interface and configured to,
deghost the seismic data (D) using a sparse τ-p inversion algorithm together with a low-rank optimization scheme to obtain a ghost-free up-going wavefield in τ-p domain,
convert the ghost-free up-going wavefield in τ-p domain into a ghost-free wave-fields ($U_0$(t,x,y)) in the time-space domain; and
process the ghost-free wave-fields ($U_0$(t,x,y) to generate the image of the surveyed subsurface,
wherein the processor uses a high-cut filter initially in the sparse τ-p inversion algorithm to obtain an initial result for the ghost-free up-going wavefield in τ-p domain p is slowness, τ is arrival time, t is time, x and y are horizontal plane coordinates.

11. The computing device of claim 10, wherein the seismic data includes only pressure data (P).

12. The computing device of claim 10, wherein the seismic data includes pressure data (P) recorded with hydrophones and particle motion data (A) recorded with particle motion sensors.

13. The computing device of claim 10, wherein the processor is further configured to:
apply band-pass filters (F) to particle motion data of the seismic data.

14. The computing device of claim 10, wherein the processor is further configured to:
construct an operator T in a τ-p domain, that when applied to ghost-free wave-fields (U(f,px,py)) in the τ-p domain, produces estimates ($D_{est}$) of the seismic data; and
apply the low-rank optimization scheme to the operator T to reduce the dimension of the ghost-free wave-fields (U(f,px,py)) in the τ-p domain.

15. The computing device of claim 14, wherein the processor is further configured to:
use the initial result of the ghost-free wave-fields (U(f,px,py)) in the τ-p domain to calculate a next ghost-free wave-field (U(f,px,py)) with a higher frequency; and
repeat the sparse τ-p inversion algorithm to calculate the ghost-free wave-fields (U(f,px,py)) in the τ-p domain.

16. The computing device of claim 15, wherein the processor is further configured to:
apply a reverse τ-p transform and an inverse Fourier transform to the ghost-free wave-fields (U(f,px,py)) in the τ-p domain to obtain the ghost-free wave-fields ($U_0$(t,x,y)) in the time space-domain.

17. The computing device of claim 10, wherein the processor is further configured to:
use only pressure data (P) to derive particle motion data (A).

18. The computing device of claim 10, wherein the seismic data is acquired with a variable-depth streamer.

19. A non-transitory computer readable medium including computer executable instructions, wherein the instructions, when executed by a processor, implement instructions for improving accuracy of an image of a surveyed subsurface, the instructions comprising:
receiving seismic data (D) recorded with seismic sensors;
deghosting the seismic data (D) using a sparse τ-p inversion algorithm together with a low-rank optimization scheme to obtain a ghost-free up-going wavefield in τ-p domain;
converting the ghost-free up-going wavefield in τ-p domain into a ghost-free wave-fields ($U_0$(t,x,y)) in the time-space domain; and
processing the ghost-free wave-fields ($U_0$(t,x,y) to generate the image of the surveyed subsurface, where a high-cut filter is used initially in the sparse τ-p inversion algorithm to obtain an initial result for the ghost-free up-going wavefield in τ-p domain, p is slowness, τ is arrival time, t is time, x and y are horizontal plane coordinates.

20. The medium of claim 19, wherein the seismic data includes only pressure data (P).

* * * * *